United States Patent
Shen

(10) Patent No.: US 6,631,731 B2
(45) Date of Patent: Oct. 14, 2003

(54) FLOW REGULATOR FOR WATER PUMP

(76) Inventor: Der-Fan Shen, 5F, No.40, Fentzu Wei Chieh, Shan-Chung City, Taipei Hsien (TW)

(*) Notice: Subject to any disclaimer, the term of this patent is extended or adjusted under 35 U.S.C. 154(b) by 2 days.

(21) Appl. No.: 09/912,463

(22) Filed: Jul. 24, 2001

(65) Prior Publication Data

US 2003/0019524 A1 Jan. 30, 2003

(51) Int. Cl.[7] ................................................ G03D 7/01
(52) U.S. Cl. ............... 137/505; 137/492.5; 137/565.13; 417/295
(58) Field of Search ............................ 137/494, 505.18, 137/492.5, 565.13, 505; 251/63; 417/295

(56) References Cited

U.S. PATENT DOCUMENTS

| | | | | |
|---|---|---|---|---|
| 2,556,623 A | * | 6/1951 | Lipkau | ........................ 137/494 |
| 2,701,704 A | * | 2/1955 | Lawrence | .................... 137/551 |
| 5,647,394 A | * | 7/1997 | Valbjorn et al. | ............. 137/501 |
| 6,273,126 B1 | * | 8/2001 | Shen | .......................... 137/501 |

* cited by examiner

*Primary Examiner*—Stephen M. Hepperle
(74) *Attorney, Agent, or Firm*—Pro-Techtor International Services

(57) ABSTRACT

A flow regulator for a water pump, comprising a valve body, a control element, a tube, a spring, and a connecting pipe. The valve body is roughly shaped like a cross, enclosing a first chamber and a second chamber in a vertical direction and having a passageway in a horizontal direction. The control element is glidingly movable in the vertical direction in the first chamber. The tube is placed in said second chamber. The spring is inserted between the control element and the tube and pushes the control element to perform a vertical movement. The connecting pipe is connected with the first tube, transmitting water pressure from a supply pipe to the first tube. The piston block is pushed inward by the water pressure, narrowing the passageway, while being pressed outward by the elastic force, so that controlled water flow and pressure in the supply pipe are achieved.

2 Claims, 5 Drawing Sheets

FLOW REGULATOR FOR WATER PUMP

BACKGROUND OF THE INVENTION

1. Field of the Invention

The present invention relates to a flow regulator for a water pump, particularly to a flow regulator for a water pump, which controls water outflow of a water pump by a differential pressure method, achieving smooth delivery of water by the water pump.

2. Description of Related Art

The water supply of modern high-rise buildings at times is not sufficient for a steady flow of water or, on the contrary, water pressure is too high, resulting in water splashing out of taps. For this reason, often water pumps are installed generating a controlled water pressure within a certain range.

Methods for regulating water pressure generated by a water pump with a motor include regulating the speed of the motor and turning the motor on and off to keep the water pressure within a pressure range.

A start-stop system for regulating water pressure mainly comprises a water pump, a pressure-sensitive switch at the outlet of the water pump, and a container. The pressure-sensitive switch detects the water pressure at the outlet of the water pump and determines the pressure range. When the water pressure falls below a lower threshold, the pressure-sensitive switch turns on the pump, increasing the water pressure in the outlet. After the water pressure has risen above an upper threshold, the pressure-sensitive switch turns off the pump. The container is installed at the outlet, storing water when the pump is turned on and releasing water when the pump is turned off. Thus the water pressure will not change rapidly, and start-stop intervals of the water pump are lengthened.

A speed-regulating system for maintaining a constant water pressure has a motor, a pressure sensor and a speed controller, which regulates the speed of the motor according to pressure values read by the pressure sensor. Thus a stable water pressure is maintained.

As compared to a speed-regulating system, a conventional start-stop system has a motor with fixed speed which is just regulated by being turned on and off. After turning on the pump, an excess outflow of water resulting in too high a pressure leads to instant turning off of the pump. Start-stop cycles of the pump easily get too short, too much energy is consumed, and the lifetime of the pump is adversely affected. Furthermore, an excess outflow of water will obstruct the pump outlet, increasing the pressure therein, as well as load on the pump and energy consumption. Therefore, a start-stop system ideally is used with pumps that deliver about as much water as is needed for the intended water supply, such that turning on the pump lets the water pressure increase only slowly and short start-stop cycles are avoided.

Since the motor of a start-stop system, when turned on, operates at a fixed speed, resulting in a constant delivered quantity of water, but demand in a large building varies with time, the pump has to be sufficiently large. Most of the time, however, demand for water is low, and a large pump is a waste of resources. In addition, pressure generated by a large pump will not be stable.

On the other hand, a speed-regulating system allows quickly to adapt the delivered water quantity to needs, avoiding the shortcoming of start-stop systems. However, the components of a speed-regulating system, a speed-regulated motor and a speed controller, are expensive and need maintenance by qualified personnel. Costs of a speed-regulated system exceed that of a start-stop system and are too large a burden for small buildings. For this reason, speed-regulated systems are generally used only in large buildings.

SUMMARY OF THE INVENTION

It is the main object of the present invention to provide a flow regulator for a water pump, which avoids too short start-stop cycles, saving energy and increasing the lifetime of the water pump.

Another object of the present invention is to provide a flow regulator for a water pump, which allows to regulate water outflow of the water pump to accommodate variations in demand of water, avoiding large mismatches of the outflow of water and demand at peak times.

The present invention can be more fully understood by reference to the following description and accompanying drawings.

DETAILED DESCRIPTION OF THE PREFERRED EMBODIMENT

Figure 1:
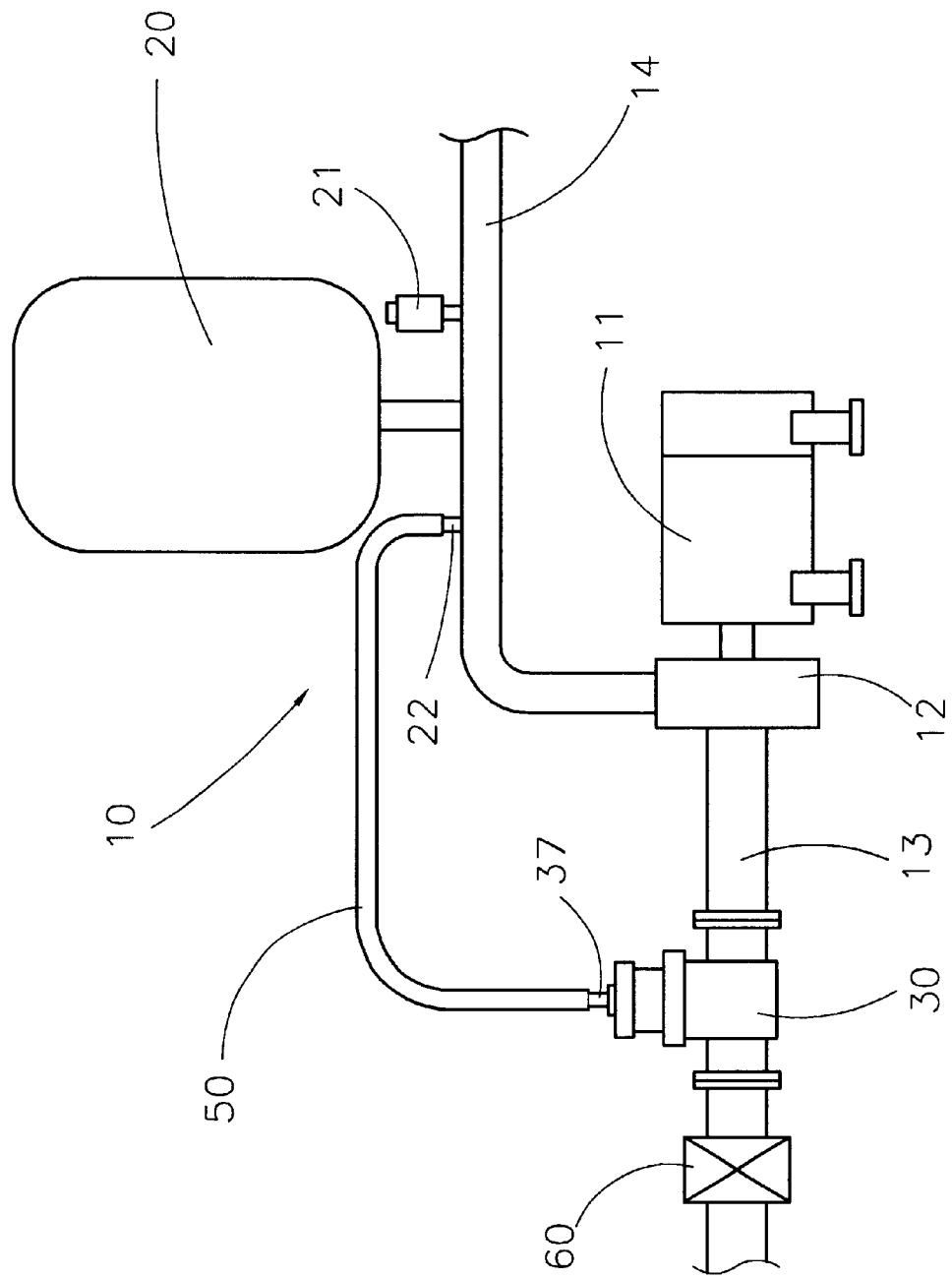
FIG. 1 is a schematic illustration of the flow regulator for a water pump of the present invention in conjunction with a water pump.

As shown in FIG. 1, the flow regulator for a water pump of the present invention is used in conjunction with a pumping system 10 which comprises: a motor 11; a pump 12, driven by the motor 11; an inlet pipe 13, connecting a water source and an inlet of the pump 12; an outlet pipe 14, beginning at an outlet of the pump 12 and delivering water from the pump 12 to supply pipes; a container 20; a pressure-sensitive switch 21; and a backflow-blocking valve 60.

The container 20 is installed at the outlet pipe 14. When the pumping system 10 is running, water enters the container 20. After stopping the motor 11, the container 20 feeds water back into the outlet pipe 14, so that upon a sudden surge of demand water pressure will not drop rapidly avoiding the need to switch on the motor after stopping the movement thereof. The pressure-sensitive switch 21 is mounted at the outlet pipe 14, sensing water pressure in the outlet pipe 14 and switching on and off the motor 11 of the pumping system 10.

The present invention has a control valve 30 which is installed at the inlet pipe 13. Water, having left the control valve 30, enters pump 12. As shown in FIG. 1, the control valve 30 has an entrance 37. A connecting pipe 50 connects the entrance 37 with a pressure outlet 22 on the outlet pipe 14, conducting water pressure from there to the control valve 30.

The main characteristic of the present invention is that the control valve 30 has a valve body 310 with a passageway of variable size. Thus water outflow from the pump 12 is adaptable to demand. If, for example, there is a sudden increase of demand and subsequently pressure in the outlet pipe 14 goes down, the control valve 30 is opened wider, and outflow from the pump 12 increases. If, on the other hand, demand decreases and pressure in the outlet pipe 14 builds up, the control valve is opened to a narrower degree, and outflow from the pump 12 decreases. Then pressure sensed by the pressure-sensitive valve 21 varies slowly, the motor 11 runs smoother, avoiding frequent starts and stops. The backflow-blocking valve 60 is installed at an inlet of the control valve 30, blocking backflow of water.

Figure 2:
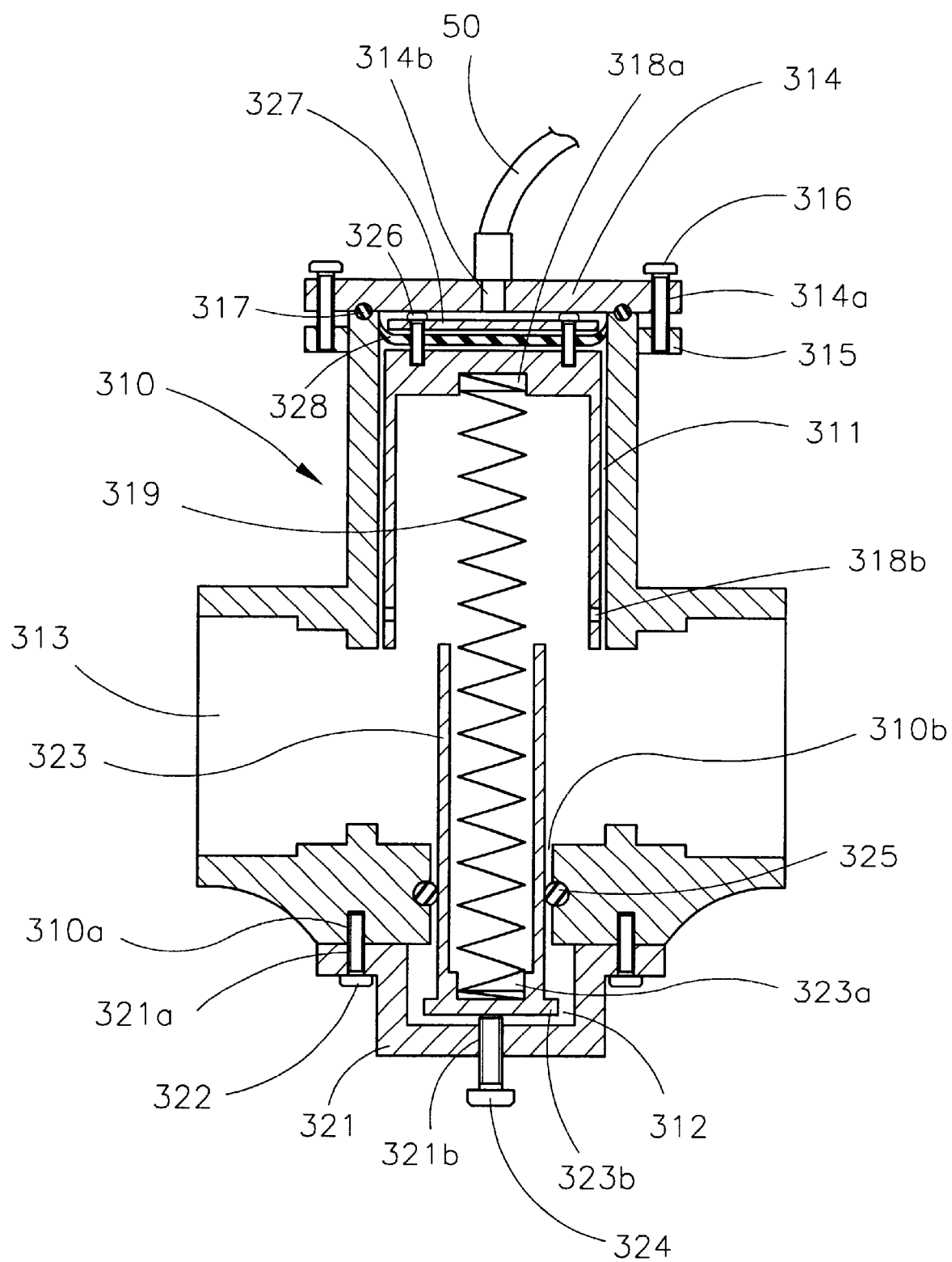
FIG. 2 is a sectional view of the control valve of the present invention.

Referring to FIG. 2, the valve body 310 is a hollow body that is roughly shaped like a cross. A vertically oriented part contains a first chamber 311 and a second chamber 312. A passageway 313 passes through in a horizontal direction. The first chamber 311 is closed by a top cap 314. A circular hole 314b is bored through the top cap 314 at a center thereof. The connecting pipe 50 is set on the circular hole 314b. Several holes 314a are arranged around the center of the top cap 314, close to an edge thereof, aligning with threaded holes 315 in an upper end of the valve body 310. Screws 316 pass through the holes 314a and enter the threaded holes 315 for fastening the top cap 314 to the valve body 310. A sealing ring 317 is laid between the top cap 314 and the valve body 310 to prevent water pressure in the first chamber 311 from escaping. A control element 318 is placed in the first chamber 311, gliding therein in the vertical direction. The control element 318 is a hollow cylindrical body which is open on a lower end and has an inner upper surface with a depression 318a. The depression 318a takes in and holds an upper end of a spring 319. Due to a small thickness of the depression 318a, the spring 319 is given a large range for a vertical movement. Screws 326 are put into an upper side of the control element 318 for fastening a holding plate 327 and a sealing ring 328 thereto to prevent water pressure in the first chamber 311 from escaping into the passageway 313. Several water flow openings 318b are cut into the lower end of the control element 318 allowing for a minimum flow of water through the passageway 313.

The valve body 310 has a lower end to which a bottom cap 321 is fastened and which encloses the second chamber 312. Several holes 321a are bored through the bottom cap 321 close to an edge thereof, aligning with threaded holes 310a in the lower end of the valve body 310. Screws 322 pass through the holes 321a and enter the threaded holes 310a for fastening the bottom cap 321 to the valve body 310. A threaded hole 321b passes through the bottom cap 321 at a center thereof, taking in an adjusting screw 324. The bottom cap 321 carries a concentrically positioned tube 323. The tube 323 has a lower end with an inner side in which a depression 323a is formed, taking in a lower end of the spring 319. The lower end of the tube 323 has an outer side that forms a flange 323b which is blocked from above by the periphery of a circular opening 310b in the lower part of the valve body 310, limiting an upward movement of the tube 323. The tube 323 has an upper part that reaches into the passageway 313. A sealing ring 325 is laid into the periphery of the circular opening 310b, enclosing the tube 323 and preventing water from the passageway 313 from entering the second chamber 312. The tube 323 surrounds the spring 319, guiding the spring 319 and protecting the spring 319 from particles brought along with water which possibly hamper the elasticity of the spring 319 or narrow the passageway 313. By turning the adjusting screw 324, as shown in FIG. 3, the distance between the tube 323 and the control element 318 is varied, changing the elastic force of the spring 319.

The passageway 313 provides a path for water to flow through the valve body 310, having two ends that are connected with the backflow-blocking valve 60 and the inlet of the pump 12, respectively.

Figure 3:
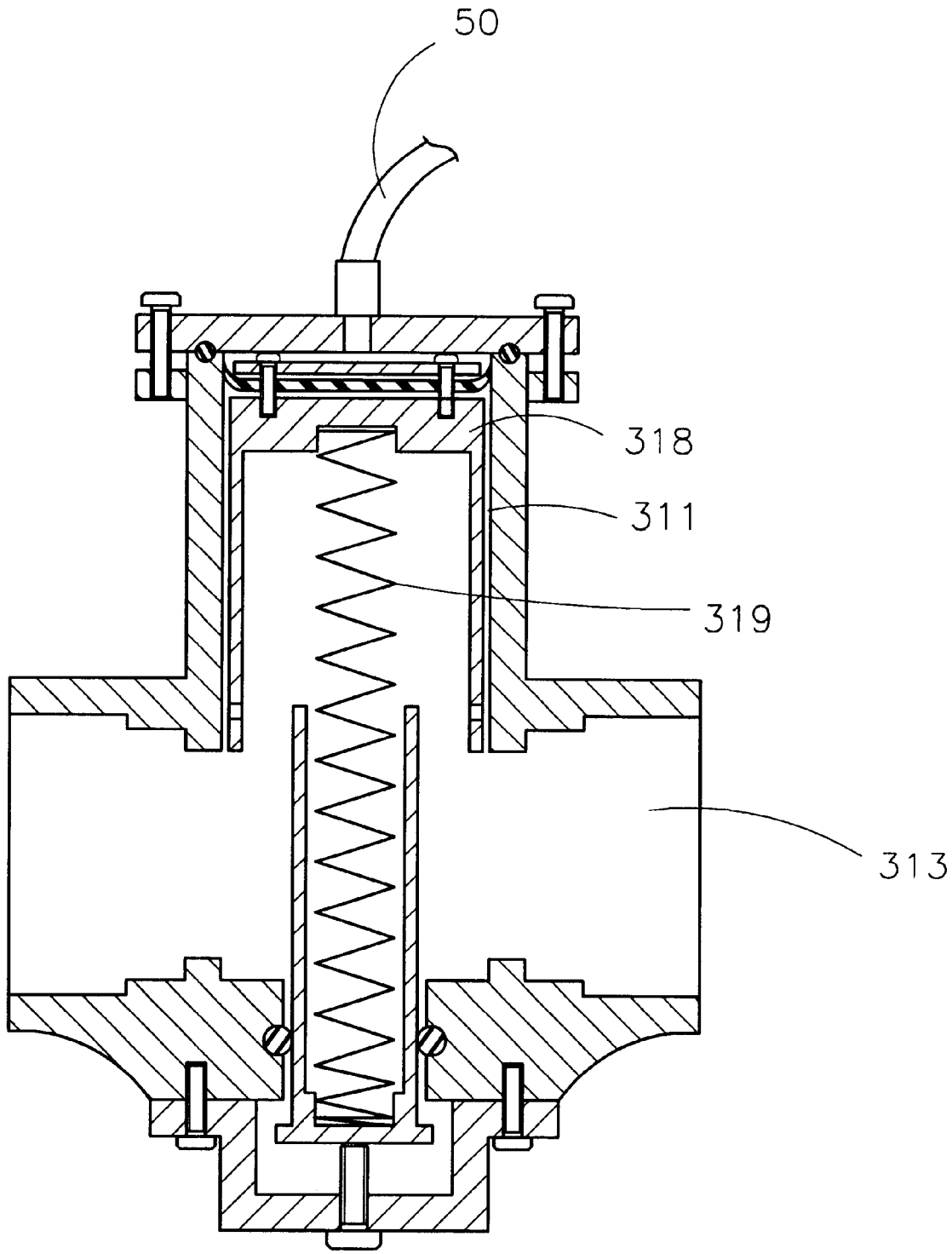
FIG. 3 is a schematic illustration of the movement of the present invention.

Referring to FIG. 3, when a maximum amount of water flow is taken from the outlet pipe 14, water pressure in the outlet pipe 14 has a minimum value, which is transmitted by the connecting pipe to the first chamber 311, so that the control element 318 is exposed to a small force due to water pressure from above, as compared to the elastic force of the spring 319 from below. Thus the spring 319 pushes the control element 318 towards an uppermost position, in which the control element 318 has completely cleared the passageway 313, and water flows therein unhindered. Then water outflow from the pump 12 has a maximum value, and maximum water flow is provided by the outlet pipe 14.

Figure 4:
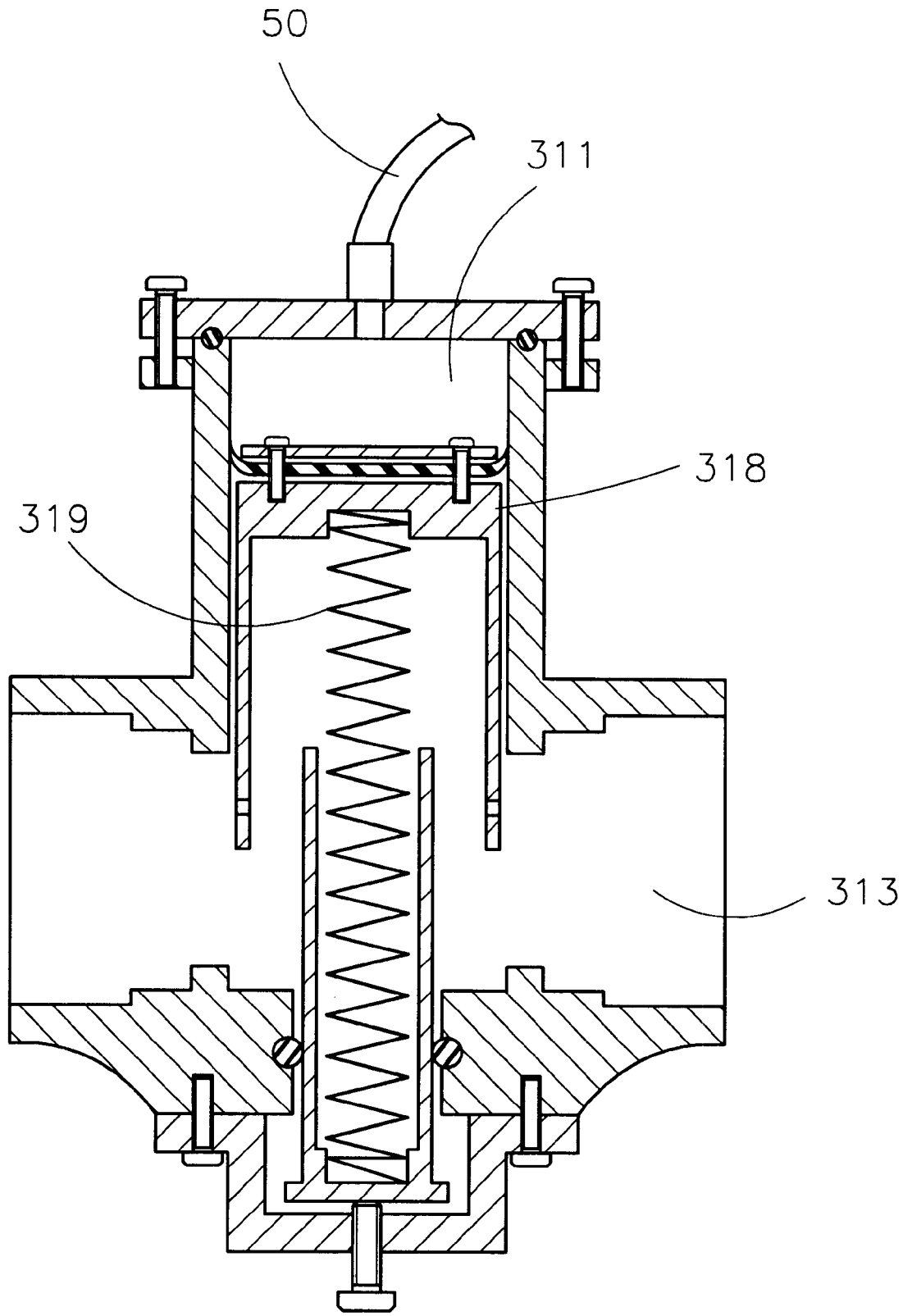
FIG. 4 is a schematic illustration of the movement of the present invention at another stage.

Referring to FIG. 4, when gradually less water flow is taken from the outlet pipe 14, water pressure in the outlet pipe 14 rises, being transmitted by the connecting pipe to the first chamber 311, so that the control element 318 is exposed to a force due to water pressure from above which overcomes the elastic force of the spring 319 from below. Thus the control element 318 is pushed downward, entering the passageway 313 and reducing water flow there.

Figure 5:
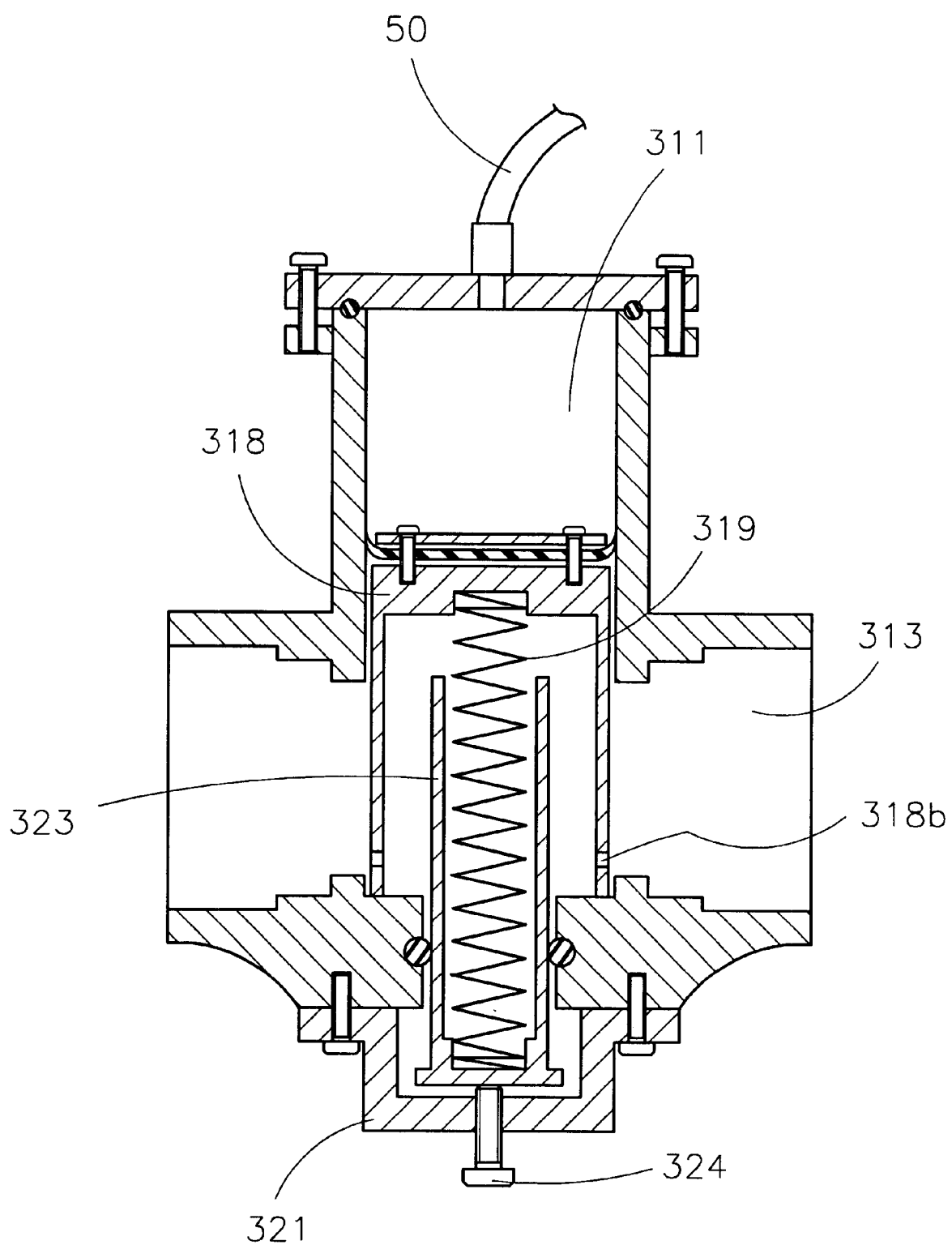
FIG. 5 is a schematic illustration of the movement of the present invention at still another stage.

Referring to FIG. 5, when no water at all is taken from the outlet pipe 14, water pressure in the outlet pipe 14 rises to a maximum value, being transmitted by the connecting pipe to the first chamber 311, so that the control element 318 is exposed to a maximum force due to water pressure from above and pushed to a lowermost position in which the passageway 313 is completely blocked except for the water flow openings 318b. When the pressure-sensitive switch 21 senses minimum water pressure, a signal is issued to stop the motor 11, avoiding useless working thereof.

The adjusting screw 324, passing through the threaded hole 321b in the bottom cap 321, allows to install the control valve 30 at various types of water pumps, adapting water pressure generated by the pump 12 to a preset water pressure range in the outlet pipe 14 by adjusting the vertical position of the tube 323 within the passageway 313, thus changing the elastic force of the spring 319 exerted on the control element 318. By finding optimum switching intervals of the motor 11, avoiding too frequent switching, the lifetime thereof is extended.

While the invention has been described with reference to a preferred embodiment thereof, it is to be understood that modifications or variations may be easily made without departing from the spirit of this invention which is defined by the appended claims.

What is claimed is:

1. A flow regulator for a water pump, comprising:
   a valve body having a first chamber and a second chamber oriented in a first direction, and passageway oriented perpendicular to said chambers;
   a cylindrical control element glidingly movable in said first chamber, said control element having an inner side with a depression therein;
   a tube placed in said second chamber and having an inner side with a depression therein;
   a bottom cap with a threaded hole at a central position therein is placed on said second chamber, said threaded hole receiving an adjusting screw,
   a spring inserted between said depression of said control element and said depression of said tube and urging said control element in said first direction; and a connecting pipe that transmits water pressure from a supply pipe to said first chamber;

wherein said control element is urged inward by said water pressure so as to narrow said passageway, while said control element is urged outward by an elastic force of said spring toward an original position, so that controlled water flow and pressure in said supply pipe are achieved.

2. A flow regulator for a water pump, comprising:

a valve body having a first chamber and a second chamber oriented in a first direction, and passageway oriented perpendicular to said chambers;

a cylindrical control element glidingly movable in said first chamber, said control element having an inner side with a depression therein, said control element having several water flow openings at a lower end thereof;

a tube placed in said second chamber and having an inner side with a depression therein;

a spring inserted between said depression of said control element and said depression of said tube and urging said control element in said first direction; and a connecting pipe that transmits water pressure from a supply pipe to said first chamber;

wherein said control element is urged inward by said water pressure so as to narrow said passageway, while said control element is urged outward by an elastic force of said spring toward an original position, so that controlled water flow and pressure in said supply pipe are achieved.

* * * * *